Dec. 15, 1953     R. C. HOFFMAN     2,662,800
TRANSMISSION
Original Filed June 17, 1947
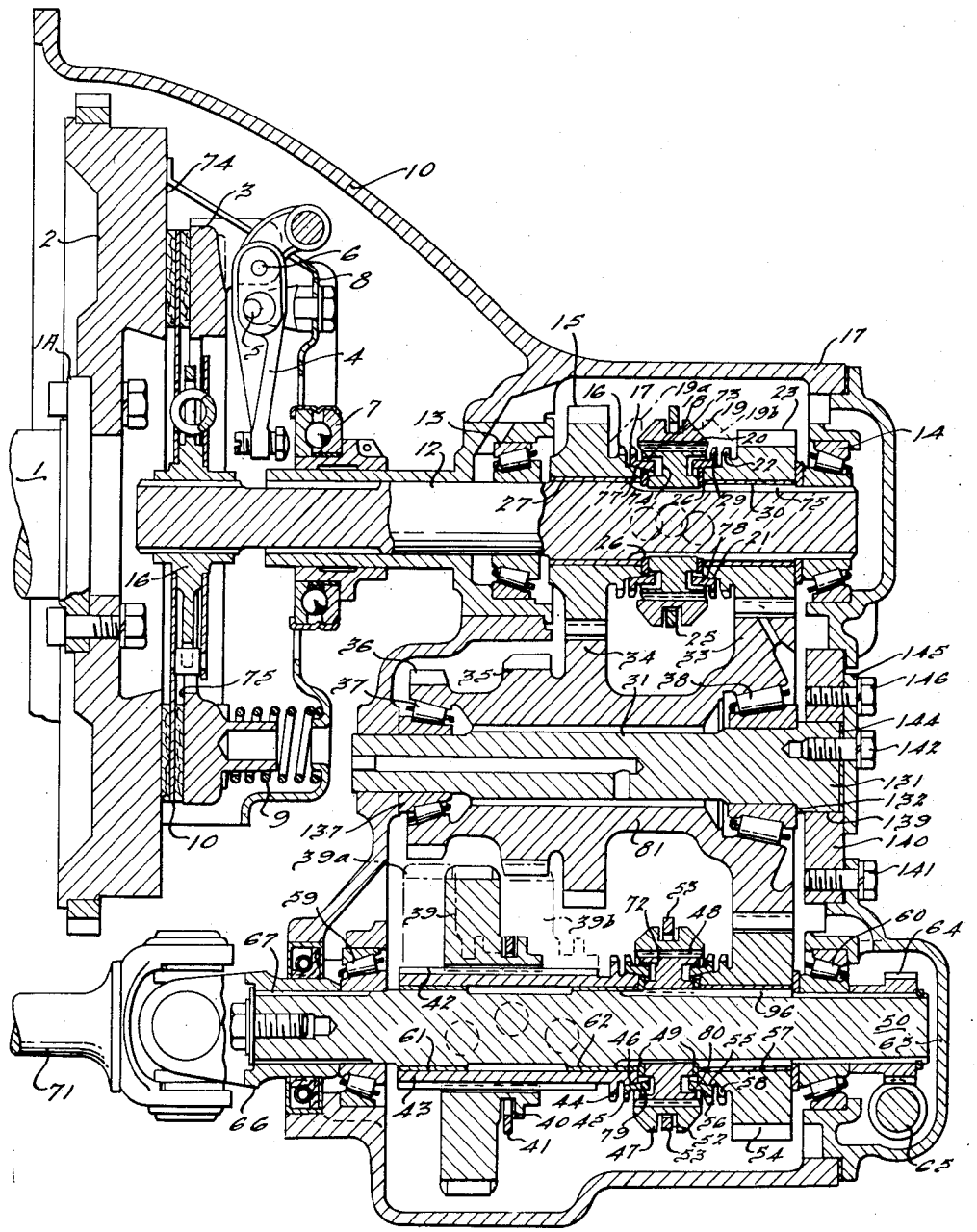
INVENTOR.
Roscoe C. Hoffman
BY
Harness, Dickey & Pierce.
ATTORNEYS.

Patented Dec. 15, 1953

2,662,800

UNITED STATES PATENT OFFICE 2,662,800

TRANSMISSION

Roscoe C. Hoffman, Detroit, Mich.

Original application June 17, 1947, Serial No. 755,212, now Patent No. 2,572,480, dated October 23, 1951. Divided and this application April 7, 1951, Serial No. 219,789

2 Claims. (Cl. 308—207)

This application is a division of my previously filed copending application Serial No. 755,212 (now Patent No. 2,572,480, issued October 23, 1951) filed June 17, 1947.

The present invention relates to change speed gear transmissions, particularly for automotive vehicles, and has as its principal object the provision of an improved and simplified transmission particularly adapted for installation in crowded quarters, as for example in vehicles wherein the engine is located transversely, as in rear engine, rear drive passenger automobiles.

Another object is to incorporate in such a transmission improved means for taking up bearing clearance.

Other objects and advantages will be apparent upon consideration of the present disclosure in its entirety.

The single figure of drawing is a central, longitudinal, sectional view of a transmission incorporating the principles of the present invention.

The main clutch

The transmission forming subject matter of this invention employs positive toothed slidable coupling means for controlling the action of the gears for the several speeds, and for that reason requires a clutch for disconnecting the power source during the coupling and uncoupling of the drives. For this purpose it operates in conjunction with a main clutch which may, as shown, be of generally conventional arrangement. The main clutch is assembled on a face 74 of a flywheel 2 bolted to a flange 1A formed on the crankshaft 1 of an engine which is not otherwise illustrated, since it forms no part of this invention. The clutch comprises a housing 8 in which a clutch pressure plate 3 is carried in such a manner that it is driven in the angular direction but is slidable axially. Upon this plate 3 bear, inside the housing 8, springs 9 urging the plate forcibly toward the flywheel 2. Between faces 74 and 75 of the flywheel 2 and the pressure plate 3, respectively, is included a driven plate 10, with friction lining thereon, which is normally held in compression between the pressure plate and flywheel.

The pressure plate 3 can be withdrawn from engagement with the driven plate 10 to release the clutch by a number of fingers 4 pivoting about studs 5 in the housing 6 and connected to the plate 3 at pivot 6 for backing it away from the driven plate 10 when the fingers 4 are acted upon by a thrust bearing 7 through the instrumentality of outside release means (not shown) in the well-known manner.

The clutch-driven plate 10 is secured to a hub 16 which is in splined engagement with a shaft 12 which is the driving shaft of the transmission. At its front end shaft 12 is piloted as by bearing means 13 in the rear end of the crankshaft.

The flywheel 2 and the clutch mechanism above described are enclosed in a bell-shaped housing 11 which is integral with a gear case 17 in which all the shafts and gears of the transmission are assembled.

Driving shaft assembly

The driving shaft 12 is supported rotatably in two axially spaced bearings 13 and 14 located in the fore and aft walls of the gear case 11. Two gears 15 and 23, on bushings 27 and 30, respectively, are mounted on the shaft 12 adjacent the bearings 13 and 14, so that these gears are free to rotate on said shaft when they are not under load, i. e., when they are not coupled to it.

Both of the gears 15 and 23 are characterized by a set of clutch teeth 16 and 22 and a cone face 18 and 21, respectively, the clutch teeth and the cone faces being elements of a conventional synchronizing clutch mechanism which is interposed between the gears 15 and 23 for coupling either one of them to the shaft 12 in a silent manner for power drive. Shiftable clutch collar 19 is movable in either direction from the central or neutral position in which it is shown in full lines in the drawing. As the shifter 25, actuated by the lever 87 and the crank 95, moves the collar 19 toward either one of the gears 15 or 23, the detent ball 84 will be forced out of the central groove 85 and thereby will allow the collar 19 to be displaced into either one of its end positions 19a or 19b. This action enables the collar 19 to be slipped into engagement with the clutch teeth 16 or 29 without clashing and establishes a coupled relationship of either the gear 15 or gear 23 with the shaft 12.

Intermediate shaft assembly

The gears 15 and 23 are in constant mesh with their mating gears 34 and 33, respectively, which latter two gears are both an integral part of a cluster 81, as are two other gears 35 and 36 on the left side of the gear 34. The whole gear cluster 81 is supported rotatably on two oppositely tapered roller-bearing assemblies 37 and 38 which are carried on a nonrotatable intermediate shaft 31. Shaft 31 projects slidably through the forward wall of the gear case 11 for support in parallel relationship to the shaft 12, and at its other end is so supported in the opposite one of said walls as to permit taking up any clearance that may develop in the countershaft bearings 37, 38. This supporting and take-up means includes a head 131 on the end of the shaft 31 forming a shoulder 132 bearing against the inner race or cone of the tapered bearing assembly 38. It will also be noted that the cone 137 of the other tapered bearing assembly bears against the gear case wall.

The head 131 is supported in an opening 139 formed in a supporting plate 140 attached to the inner face of the gear case rear wall by cap screws 141. A cover plate 145 closes the outer end of opening 139 and covers the shaft head 131, being secured to supporting plate 140 by cap screws 146, and additional cap-screw means as 142 extend through the cover plate into one or more tapped openings in the end of shaft 31 to hold the shaft against endwise movement. Shim means as 144 is interposed between the end of the shaft and the gear case wall. It will be seen that by changing the thickness of the shim means, the position of the shaft 31 can be axially adjusted to simultaneously correct clearance that may develop in either or both of the bearings 37, 38.

*Final drive-shaft assembly*

A third shaft 50, in parallel relationship to the shafts 12 and 31, constitutes the final drive shaft of the transmission for power take-off; it is carried rotatably in two bearings 59 and 60 in the end walls of the gear case 11, and positioned on it next to the bearing 60 is a gear 54 which is in mesh with the gear 33 of the cluster 31. The gear 54 is fitted with a bushing 57 on the shaft 50 for free rotation thereon when not under power.

Integral with the gear 54 is a set of clutch teeth 58 and a cone face 55 adjacent thereto, these being elements of a synchronizing clutch mechanism analogous to that disclosed hereinabove on the shaft 12.

Also carried rotatably on the shafts 50, next to the bearing 59 is a sleeve 43 which runs on bushings 61 and 62 and which is characterized by a splined periphery 42, the splines extending over its major portion from the bearing 59 toward its opposite end whereat the sleeve 43 is provided with a set of clutch teeth 44 and a cone face 46 adjacent thereto at the axial extremity. These teeth and cone face constitute the engaging means on the sleeve 43 for the aforementioned synchronizing clutch.

On the splines 42 of the sleeve 43 is mounted slidably a gear 39 which is movable lengthwise between three functional positions by a shifter 41 engaging the gear in a groove 40.

The mechanism for shifting the gear 39 by means of the shifter 41 is similar to that described in connection with the collar 19 and includes a crank 94 which holds, on a swivel, the shifter 41. The crank 94 is rocked angularly by a shaft 93 in the wall of the gear case 11 and by an outside lever 92, the rocking motion of the crank being confined between three operational positions as established by three grooves 91 in proper angular spacing on the arcuate perimeter of the crank 94. A detent ball 91, forcibly backed by a spring 89, drops into the groove 91 defining any one of the three positions of the shifter 41 and the gear 39 and yieldably holds them in that position until dislodged forcibly by the lever 92 and transferred into another groove.

The collar 47 of the synchronizing clutch has a peripheral groove 52 for a shifter 53 and is movable from its central or neutral position, sideways into either one of its extreme axial positions in mesh with either the teeth 44 on the sleeve 43, or the teeth 58 on the gear 54.

The mechanism for providing the shifter 53 and the collar 47 with their translatory movement and for locking them in their middle as well as extreme end positions is substantially the same as that described hereinabove in connection with the shifter 25.

Located on and near the extremities of the shaft 50 adjacent the bearings 59 and 60, respectively, and secured to said shaft by means of splines 67 and 86 are a universal joint 66 and a speedometer drive gear 64 respectively. The universal joint 66 couples the shaft 50 to a vehicle propelling shaft 71; the speedometer drive gear 65 meshes with a mating gear 65 in a housing 63 for a speedometer shaft take-off.

*Functional description of the transmission*

The various gears and shafts of this embodiment in their particular and novel relationship as disclosed hereinabove, can produce four different speed ratios in the forward direction of a vehicle and two in the reverse, these ratios being obtainable by operating the three shifters in such a manner as to establish certain combinations between the gears as disclosed.

The lowest forward speed ratio is obtained from neutral as follows: The shifter 41 slides the gear 39 from neutral towards the right into mesh with the gear 35, the shifter 25 moves the collar 19 into mesh with the teeth 22, thereby coupling the shaft 12 to the gear 23, which drives the cluster 31 including the gear 35. The latter gear, by virtue of being in mesh with the gear 39 on the shaft 50, drives the sleeve 43 on the same shaft. In order to couple the sleeve 43 to the shaft 50 for final drive, the shifter 53 is then moved into its extreme left position whereby the collar 47 will engage the teeth 44 and thereby transmit power from the sleeve 43 into the shaft 50.

It may be observed that as many as three distinct shifting operations are required to put the transmission into gear for one particular ratio. Two of these, i. e., the shifting of the two synchronizing clutch collars 19 and 47, can be effected simultaneously, but for either this simultaneous shift, or for the shift of the gear 39 into mesh with the gear 35, a declutching operation of the clutch plate 4 is a prerequisite in the same manner as in shifting the gears of conventional vehicle transmissions.

An intermediate second speed is obtained by retaining the gear 39 and the collar 47 in engagement with their mating members 35 and 43, respectively, and moving the collar 19 by means of the shifter 25 into engagement with the gear 15 through the speed synchronizing procedure hereinabove described. The flow of power then will be through the shaft 12 into the hub 74, the collar 19, the gears 15, 34, and 39, the sleeve 43, the collar 47, the hub 72, and the shaft 50.

Another intermediate or third speed is put into operation by leaving the collar 19 in engagement with the gear 23 as in the second speed, and shifting the collar 47 into engagement with the gear 54 through the synchronizing action of the mechanism hereinabove described. This operation releases the gear 39 from positive engagement.

A high gear ratio which may give an overdrive effect is obtainable in the novel transmission of this description by retaining the collar 47 in engagement with the gear 54, and shifting the collar 19 into engagement with the gear 15. The active gears will then be the gears 15, 34, 33, and 54.

It will be apparent that variations and modifications may be introduced without departing from the fair and intended scope of the subjoined claims.

I claim:

1. Means for adjustably journaling a rotatable body within a case which has an opening in one wall thereof and which also has a supporting portion spaced from but substantially aligned with said opening, a stationary spindle adapted to be carried at one end by said supporting portion, a closure member for said opening, said spindle being longitudinally movable in said supporting portion and removable through said opening, means for securing said spindle to the closure in different longitudinal positions, and a pair of oppositely facing tapered antifriction bearings supported by said spindle and adapted to journal a rotatable body, one of said bearings having a race portion longitudinally movable with the spindle and the other bearing having a race portion held against such longitudinal movement.

2. Means for adjustably journaling a rotatable body within a case which has an opening in one wall thereof and which also has a supporting portion spaced from but substantially aligned with said opening, a stationary spindle adapted to be carried at one end by said supporting portion and at the other end by a portion of the case appurtenant to said opening, said spindle being longitudinally movable in said supporting portion and removable through said opening, means carried by the case for securing said spindle in different longitudinal positions, and a pair of oppositely facing tapered antifriction bearings supported by said spindle and adapted to journal a rotatable body, one of said bearings having a race portion longitudinally movable with the spindle and the other bearing having a race portion held against such longitudinal movement, the means for securing the spindle including a cap portion normally closing said opening.

ROSCOE C. HOFFMAN.

References Cited in the file of this patent

UNITED STATES PATENTS

| Number | Name | Date |
|---|---|---|
| 2,408,899 | Wright | Oct. 8, 1946 |